US006441804B1

(12) United States Patent
Hsien

(10) Patent No.: US 6,441,804 B1
(45) Date of Patent: Aug. 27, 2002

(54) TRANSMITTER AND RECEIVER FOR USE IN A WIRELESS CURSOR CONTROL SYSTEM

(75) Inventor: Po-Hsun Hsien, Kaohsiung (TW)

(73) Assignee: KYE Systems Corp. (TW)

( * ) Notice: Subject to any disclaimer, the term of this patent is extended or adjusted under 35 U.S.C. 154(b) by 0 days.

(21) Appl. No.: 09/241,626

(22) Filed: Feb. 1, 1999

(30) Foreign Application Priority Data

Feb. 23, 1998  (TW) ..................................... 87202575 U

(51) Int. Cl.[7] .................................................. G09G 5/08
(52) U.S. Cl. ........................ 345/158; 345/163; 345/156; 375/304; 375/334
(58) Field of Search ................................. 345/158, 156, 345/157, 163, 167, 168, 211, 212; 375/295, 316, 303, 304, 334, 335

(56) References Cited

U.S. PATENT DOCUMENTS

| 4,013,961 | A | * | 3/1977 | Colebourn | .................. 455/115 |
| 4,682,344 | A | * | 7/1987 | Somer | .......................... 375/303 |
| 4,969,050 | A | * | 11/1990 | Maier et al. | ................... 386/96 |
| 5,081,628 | A | * | 1/1992 | Maekawa et al. | ........... 714/750 |
| 5,457,434 | A | * | 10/1995 | Partow | .................. 331/117 FE |
| 5,793,359 | A | | 8/1998 | Ushikubo | |
| 5,812,115 | A | | 9/1998 | Fan et al. | |
| 5,854,621 | A | | 12/1998 | Junod et al. | |
| 5,986,644 | A | * | 11/1999 | Herder et al. | ................ 345/158 |
| 5,990,868 | A | * | 11/1999 | Frederick | ..................... 345/158 |

* cited by examiner

Primary Examiner—Bipin Shalwala
Assistant Examiner—Ricardo Osorio
(74) Attorney, Agent, or Firm—Raymond Sun

(57) ABSTRACT

A wireless cursor control system is provided that includes a pointing device and a receiver. The pointing device has a controller for receiving user input and for providing a control signal, and a transmitter that includes an antenna and a high frequency modulator coupled to the controller for receiving the control signal and for generating an output signal for transmission via the antenna. The high frequency modulator includes a variable frequency modulator circuit for selectively changing the frequency deviation of the control signal, and a high frequency circuit for increasing the frequency deviation of the control signal to produce the output signal. The receiver has an antenna that receives the output signal, and a demodulation circuit for demodulating the received output signal.

22 Claims, 14 Drawing Sheets

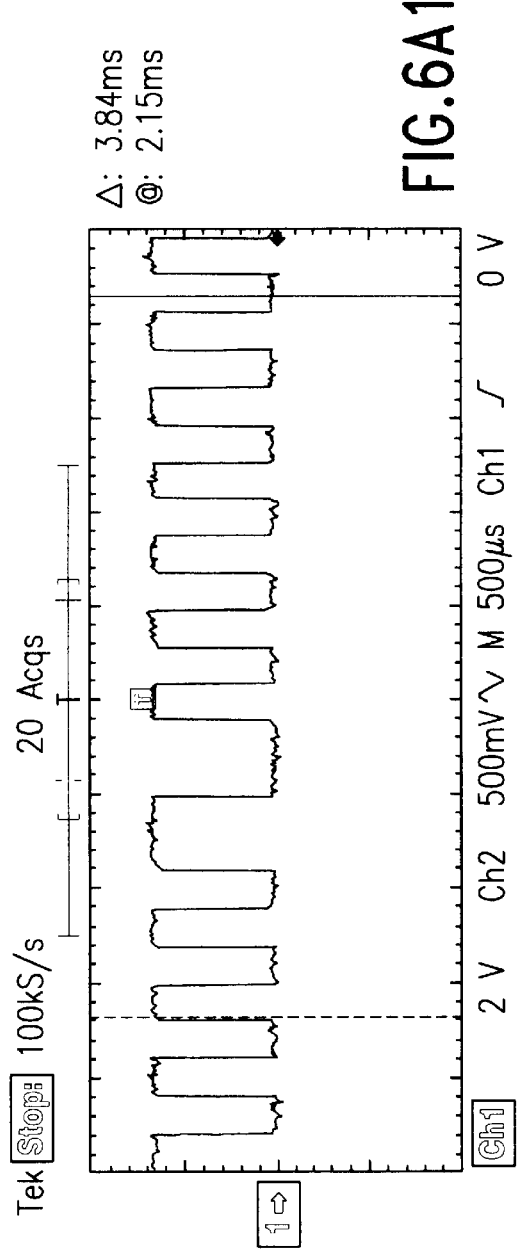
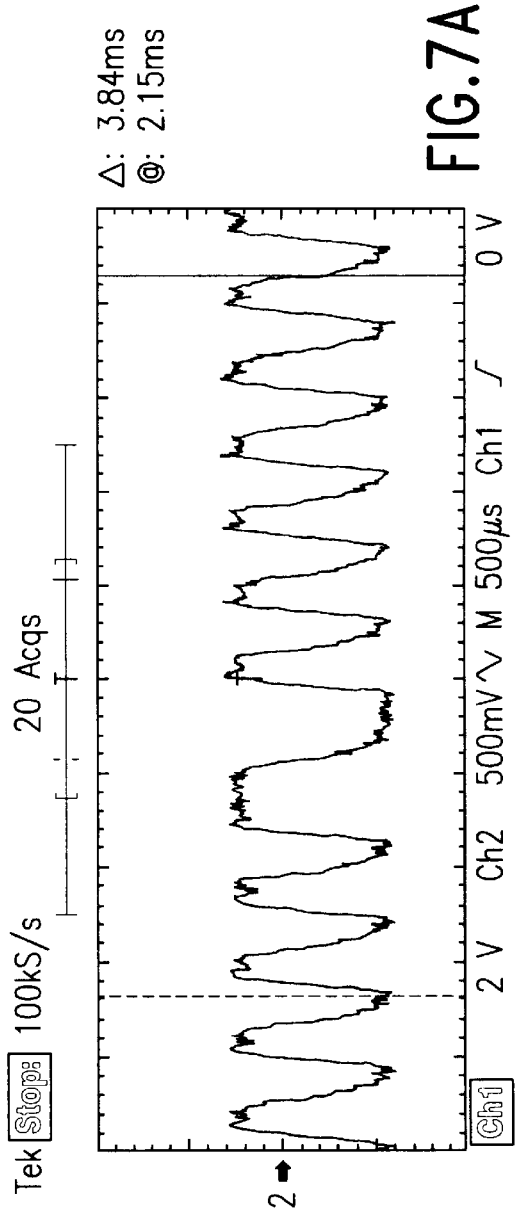

FIG.6A2

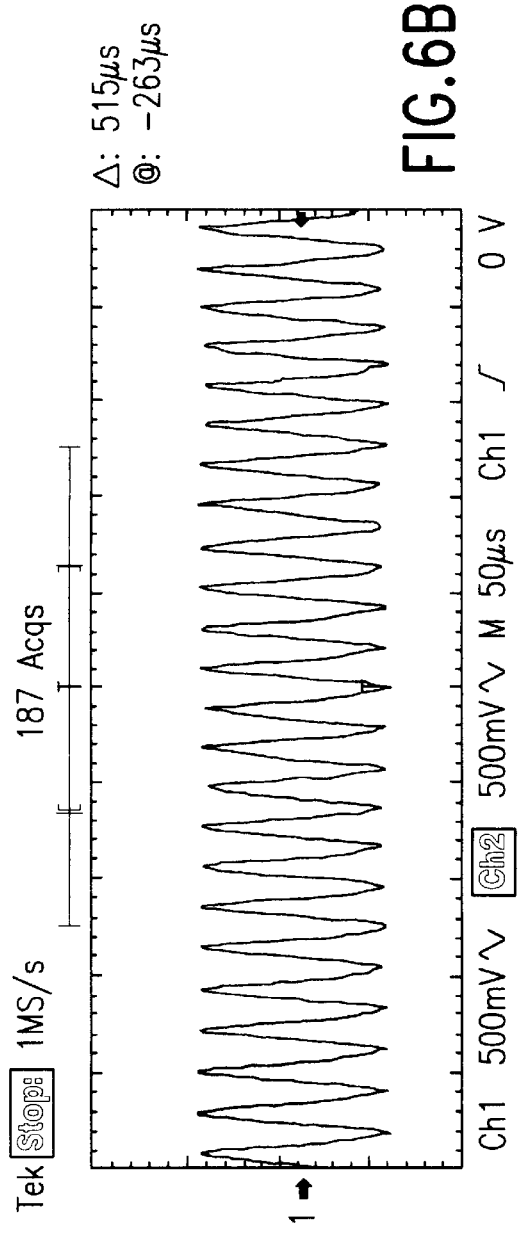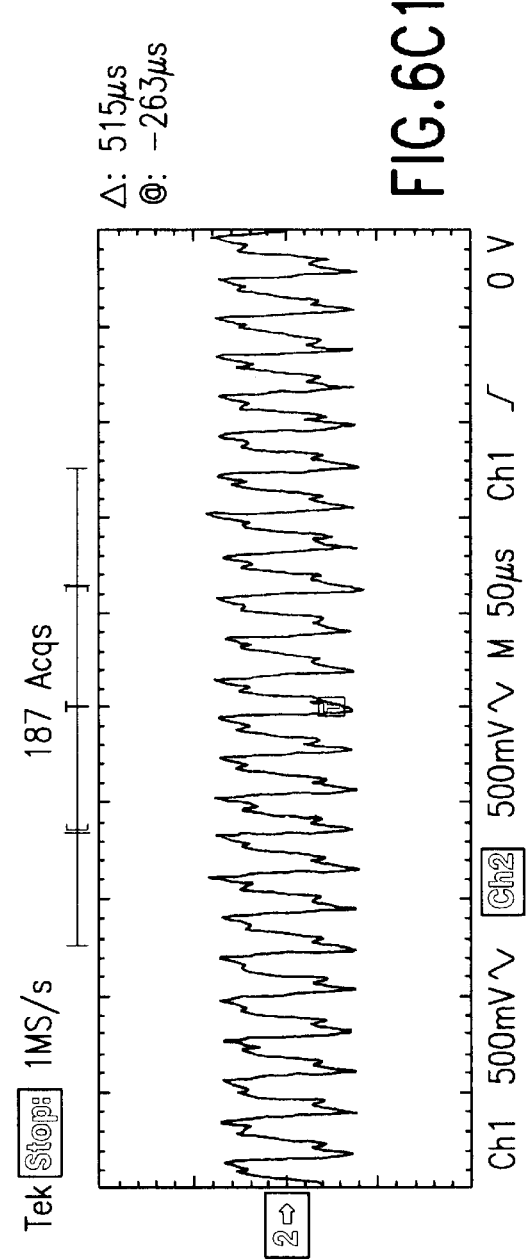

FIG.6C2

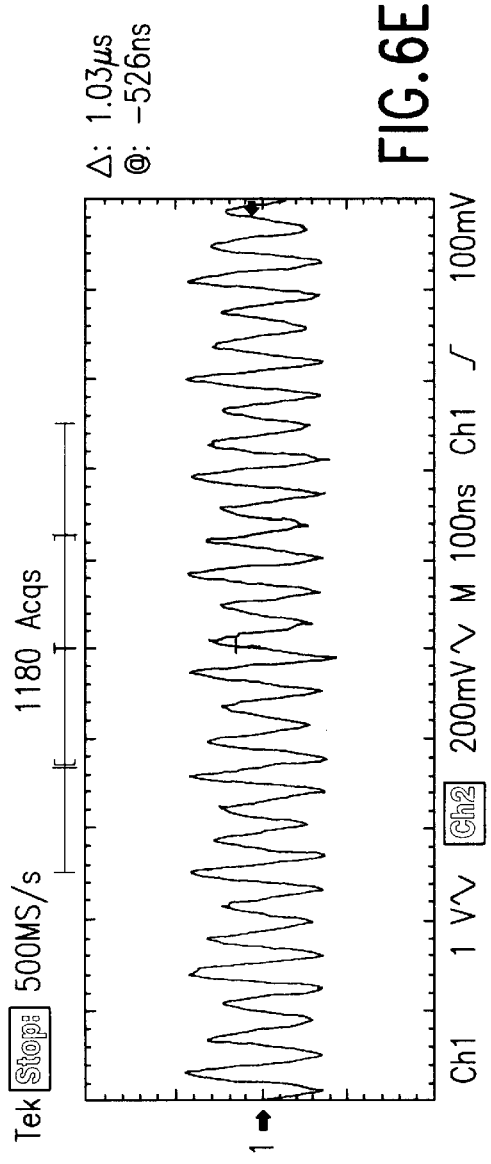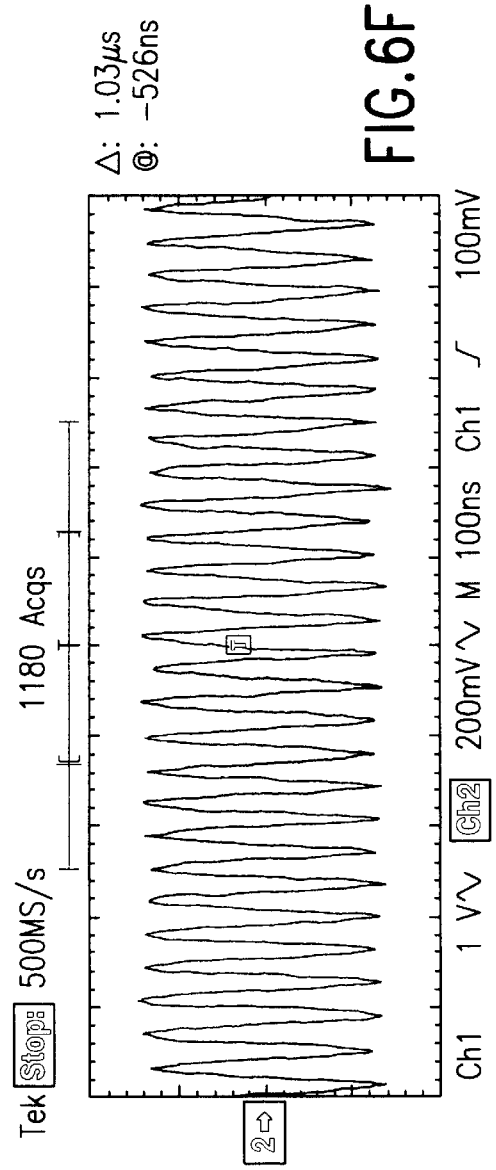

TRANSMITTER AND RECEIVER FOR USE IN A WIRELESS CURSOR CONTROL SYSTEM

BACKGROUND OF THE INVENTION

1. Field of the Invention

The present invention relates generally to user input devices, and in particular, to a transmitter and receiver for use in a wireless cursor pointing system.

2. Background Art

Initially, input devices such as mice and track-balls were all tethered to a personal computer (PC) via a cable or wire. Because of the inconvenience and inflexibility of wired input devices, there was a need for an effective wireless mouse.

One type of conventional wireless mouse employed infra-red transmission and detection. However, because of the line-of-sight restrictions for infra-red transmissions, this approach was not successful. Another conventional wireless mouse employed amplitude modulation (AM) schemes. However, because AM modulated signals are subject to interference from many sources (e.g., radios, monitors employed in a computer system, and other appliances), this approach was also ineffective.

Conventional wireless mice do not currently employ frequency modulation (FM) schemes. One benefit of FM is that it can provide better discrimination against noise and interference than AM. However, conventional FM systems in cordless phones or similar wireless devices (i.e., an interphone) for analog transmission generate an FM wave with frequency deviation using the modulation method of the variable capacitance diode, but their associated circuits are complex and costly to implement.

Furthermore, receivers employed in conventional wireless mouse systems are designed to improve the sensitivity (i.e., ability to receive weaker signals) of the receivers, and to improve the selectivity (i.e., ability to separate the signals of different stations) of the receivers. As a result, the circuits for these receivers can be complex and costly. In addition, conventional receivers have three types of output circuits or buffers, as shown in FIGS. 8A–8C. For example, FIG. 8A illustrates an output circuit that provides reverse output through a combination of transistors and load resistance, thereby increasing current and power dissipation of the circuit. The buffer in FIG. 8B is a differential amplifier, which can increase cost and waste power. The buffer in FIG. 8C employs a three transistor exchange output circuit which requires a push-pull amplifier. The buffer in FIG. 8C adds to the complexity and the cost of the receiver.

Accordingly, there remains a need for a wireless cursor pointing system that includes a transmitter and a receiver that overcome the disadvantages set forth previously in a cost-effective manner while maintaining good signal quality.

SUMMARY OF THE INVENTION

It is an object of the present invention to provide a wireless cursor control system having a high frequency transmitter circuit disposed in the cursor pointing device.

It is another object of the present invention to provide a wireless cursor control system having a high frequency transmitter circuit with a high frequency circuit for increasing the frequency deviation of the oscillation frequency.

It is a further object of the present invention to provide a wireless cursor control system having a high frequency transmitter circuit with a variable frequency modulation circuit for selectively changing the amount of frequency deviation of the variable frequency.

It is also an object of the present invention to provide a wireless cursor control system having a high frequency receiver with a double transistor exchange output having low current consumption, thereby reducing loading effect.

The objects of the present invention can be accomplished by providing a wireless cursor control system that includes a pointing device and a receiver. The pointing device has a controller for receiving user input and for providing a control signal, and a transmitter that includes an antenna and a high frequency modulator coupled to the controller for receiving the control signal and for generating an output signal for transmission via the antenna. The high frequency modulator includes a variable frequency modulator circuit for selectively changing the frequency deviation of the control signal, and a high frequency circuit for increasing the frequency deviation of the control signal to produce the output signal. The receiver has an antenna that receives the output signal, and a demodulation circuit for demodulating the received output signal.

BRIEF DESCRIPTION OF THE DRAWINGS

FIGS. 6A1, 6A2, 6B, 6C1, 6C2, 6D, 6E and 6F illustrate waveforms of signals at various nodes of the transmitter of FIG. 2.

FIGS. 7A and 7B illustrate waveforms of signals at various nodes of the receiver of FIG. 4.

DETAILED DESCRIPTION OF THE INVENTION

In the following description, for purposes of explanation and not limitation, specific details are set forth in order to provide a thorough understanding of the present invention.

However, it will be apparent to one skilled in the art that the present invention may be practiced in other embodiments that depart on these specific details. In certain instances, detailed descriptions of well-known or conventional data processing techniques, hardware devices and circuits are omitted so as to not obscure the description of the present invention with unnecessary detail.

1. The System 10

Figure 1:
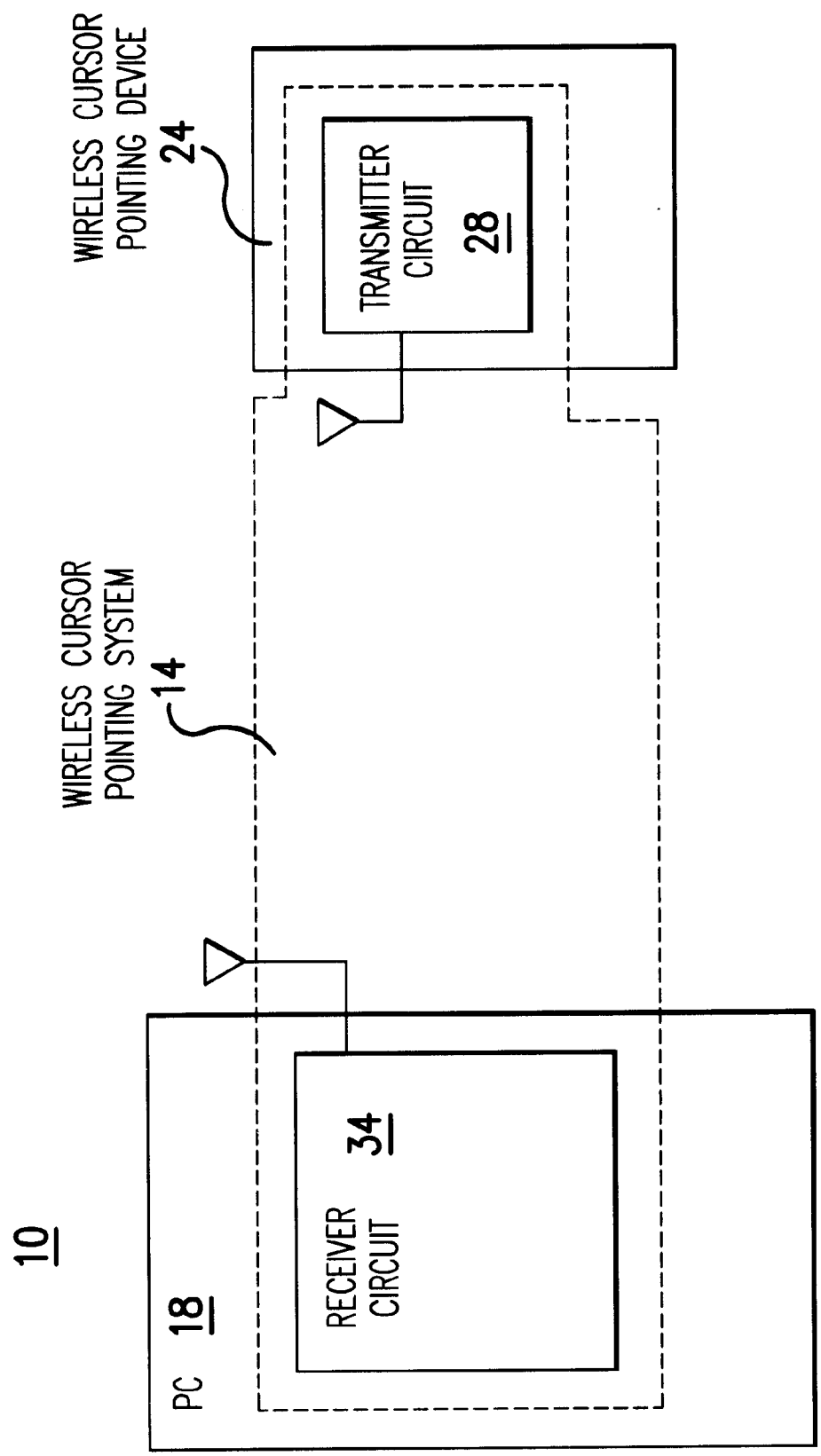
FIG. 1 illustrates a system in which the wireless cursor pointing system of the present invention can be implemented.

FIG. 1 illustrates a system 10 in which the wireless cursor pointing system 14 of the present invention can be implemented. Computer system 10 includes a personal computer (PC) 18 and a wireless cursor pointing device 24. Wireless cursor pointing system 14 includes (1) a transmitter circuit 28 adapted to receive user input and for transmitting user input to PC 18, and (2) receiver circuit 34 for receiving the user input from transmitter circuit 28. Transmitter circuit 28 and receiver circuit 34 are described in greater detail in FIGS. 2 and 4, respectively.

Wireless cursor pointing device 24 can be, without limitation, a mouse, track-ball, touch-pad, key-pad, keyboard, or any device used to control a cursor or to input information into PC 18.

2. Transmitter 28

Figure 2:
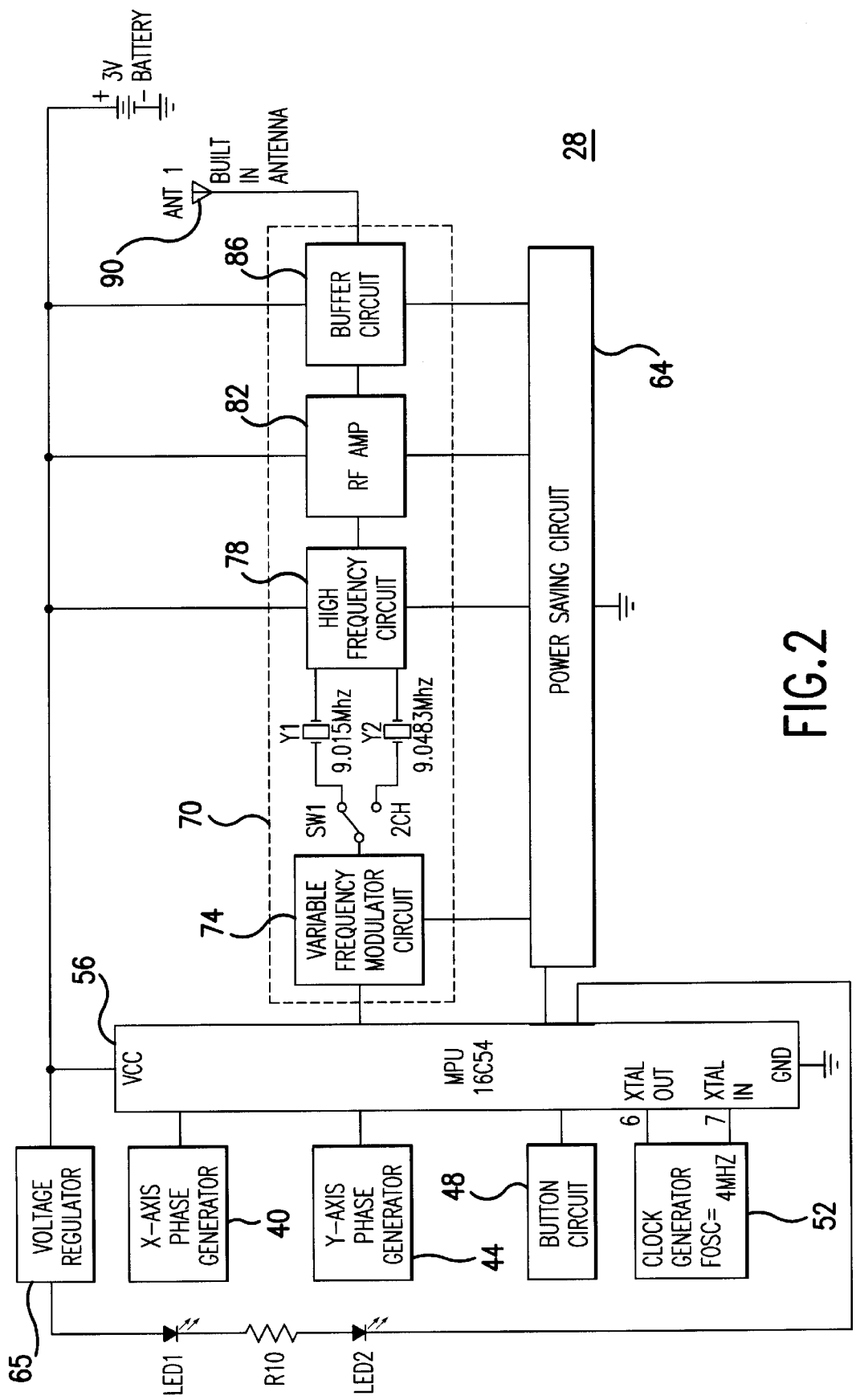
FIG. 2 is a block diagram illustrating the transmitter of FIG. 1 configured in accordance with one embodiment of the wireless cursor pointing system of the present invention.

FIG. 2 is a block diagram illustrating the transmitter circuit 28 of FIG. 1 configured in accordance with one embodiment of the wireless cursor pointing system 14 of the present invention. Transmitter circuit 28 includes an X-axis phase generator 40 for generating X position information regarding cursor pointing device 24 and a Y-axis phase generator 44 for generating Y position information regarding the cursor pointing device 24. Transmitter circuit 28 also includes a button circuit 48 for receiving user activated button signals and a clock generator 52 for generating a clock signal. Transmitter circuit 28 also includes a controller 56 that is coupled to X-axis phase generator 40, Y-axis phase generator 44, button circuit 48, and clock generator 52.

Although the present invention is described in connection with a wireless mouse, it will be understood by those of ordinary skill in that art that controller 56 can be coupled to different functional blocks other than those shown in FIG. 2 when wireless cursor pointing device 24 is other than a wireless mouse.

Controller 56 receives digital signals and converts the digital signals into an analog cursor control signal. Specifically, controller 56 receives the X position information, Y position information, button signals, and clock signals, and responsive thereto, generates an analog cursor control signal for moving, directing or otherwise providing information to PC 18. The structure and operation of the X-axis phase generator 40, Y-axis phase generator 44, button circuit 48, and clock generator 52, and in particular how these components operate to generate position and other control signals or information, can be the same as those used in similar circuits for conventional input devices, and are not explained in further detail.

Transmitter circuit 28 includes a high frequency modulator 70 that is coupled to controller 56 for receiving the analog cursor control signal and for generating a high frequency version of the cursor control signal. High frequency modulator 70 includes a variable frequency modulator circuit 74 which selectively changes the amount of frequency deviation of the oscillation frequency based on the different voltages which are received. A high frequency circuit 78 is coupled to the variable frequency modulator circuit 74 for receiving the output thereof and for increasing the frequency deviation of the signal by a factor (e.g., increasing the frequency of the signal by a factor of three). An RF amplifier 82 is coupled to the output of the high frequency circuit 78 for rectifying and amplifying the signal, and a buffer circuit 86 is coupled to the output of the RF amplifier 82 for tuning the output (i.e., for passing only those received signals in a desired bandwidth) and transmitting the output via an antenna 90.

Transmitter circuit 28 also includes a power saving circuit 64 for power conservation. Power saving circuit 64 is coupled to high frequency modulator 70 and controller 56 and detects whether controller 56 has received any input from button circuit 48. If it is determined that no input has been received by controller 56 for a predetermined time period (i.e., after a predetermined time, such as 30 or 45 seconds, of non-use), power saving circuit 64 automatically switches transmitter 28 into a power-saving mode by disconnecting the RF amplifies 82 and the buffer circuit 86. In the power-saving mode, only button circuit 48, clock generator 52, and controller 56 are on, and the remaining circuits, including circuits 40, 44, 74, 78, 82, and 86, are turned off. Upon user activation of any of the buttons of button circuit 48, transmitter 28 comes out of the power-saving mode into a normal mode in which all circuits are powered.

A switch 75 is coupled to variable frequency modulator circuit 74 to selectively provide high frequency circuit 78 with one of two channels or frequencies. A first frequency is generated by a first crystal (Y1), and a second frequency is generated by a second crystal (Y2). In the preferred embodiment, the first frequency is 9.015 Mhz, and the second frequency is 9.0483 Mhz. Switch 75 can be manually controlled by a user to allow the user to select different frequencies when employing more than one wireless cursor pointing device 28.

An antenna 90 is coupled to the output of the buffer circuit 86 to transmit the modulated high frequency version of the cursor control signal to the receiver 34.

The variable frequency modulator circuit 74, high frequency circuit 78, RF amplifier 82 and buffer circuit 86 can all employ frequency shift keying (FSK), which is a form of digital transmission in an FM system. The FSK is a special case of an FM wave.

Figure 3A:
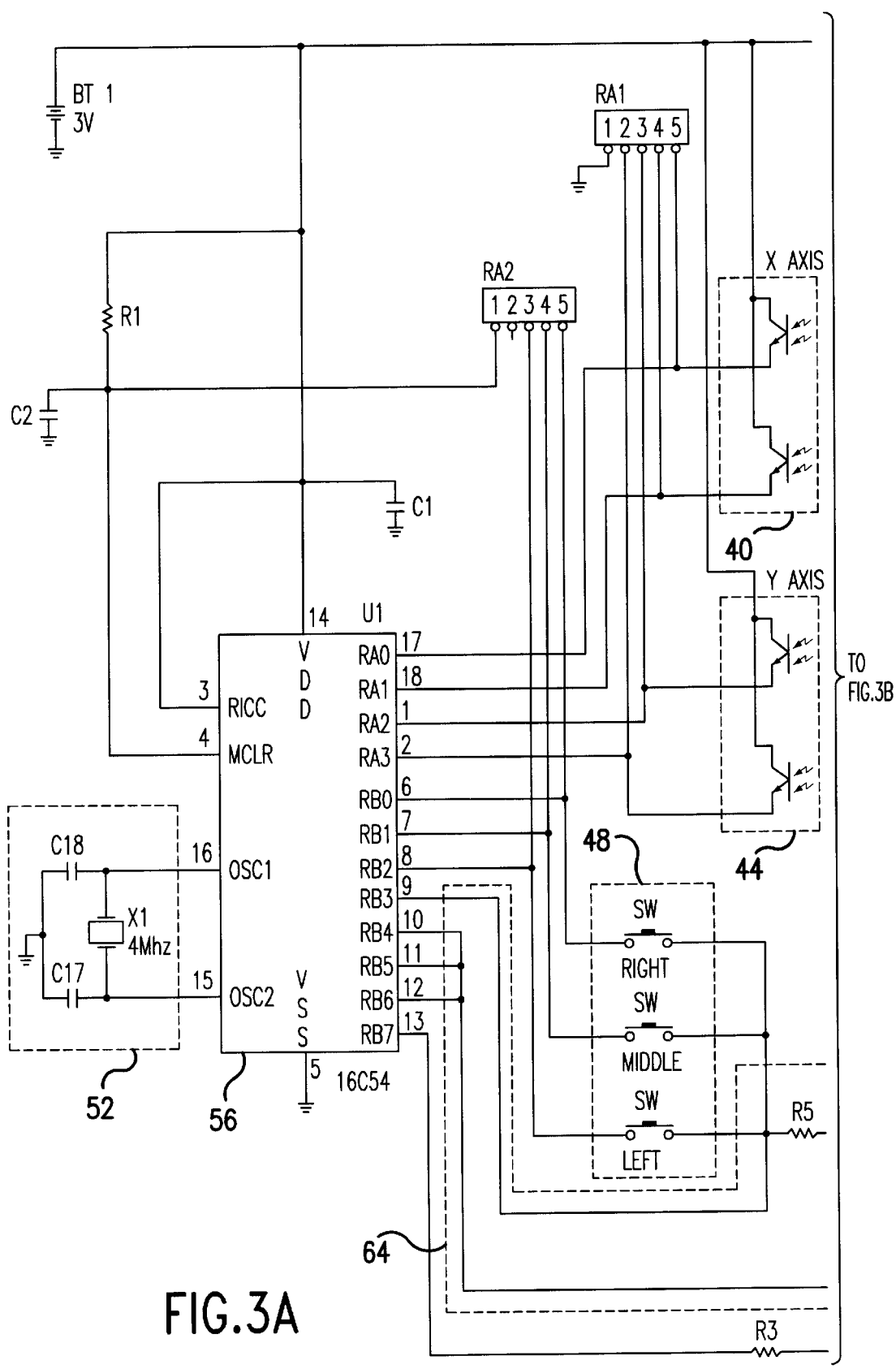
FIG. 3 is a circuit diagram illustrating in greater detail the transmitter of FIG. 2.
Figure 3B:
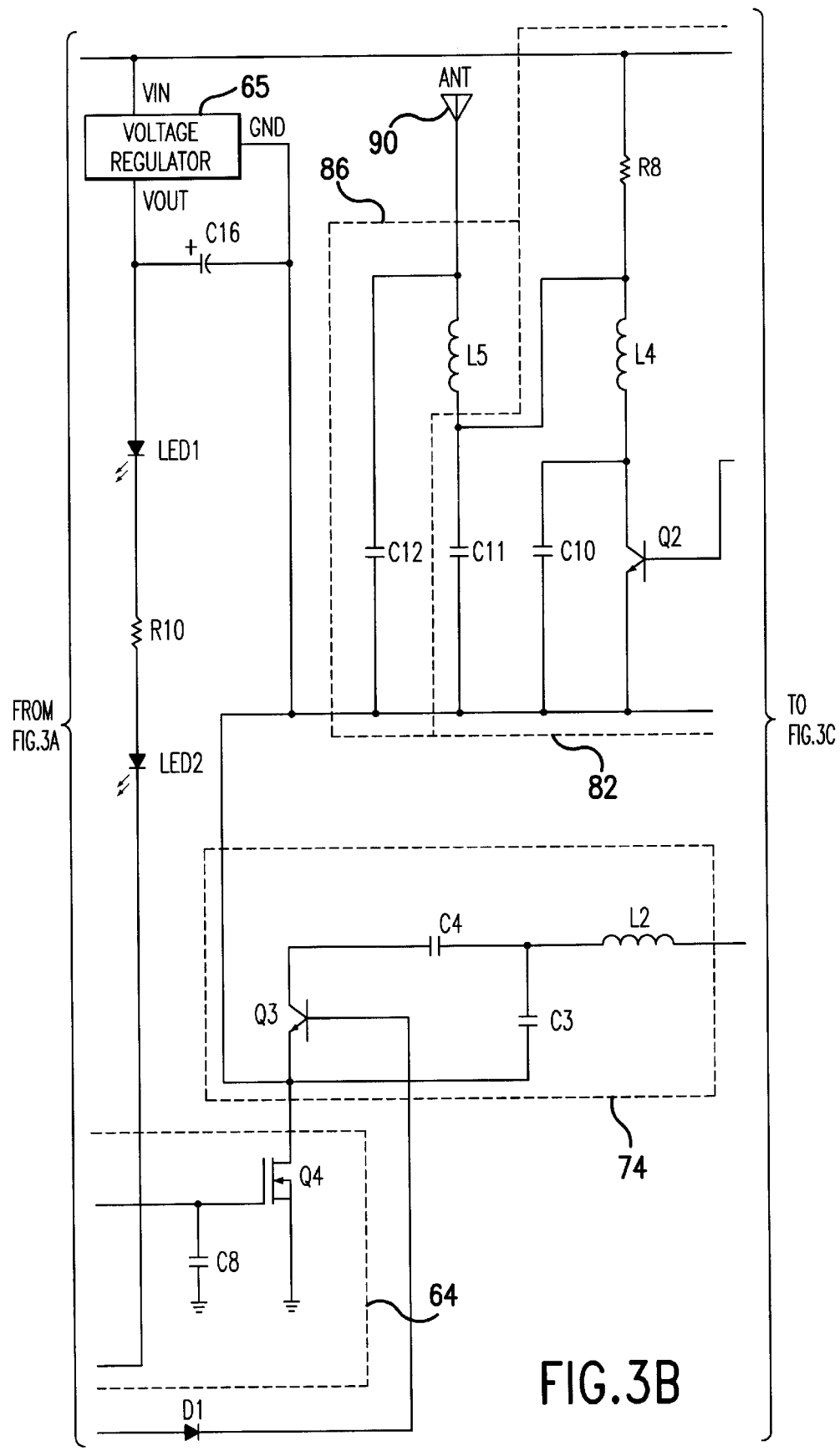
Figure 3C:
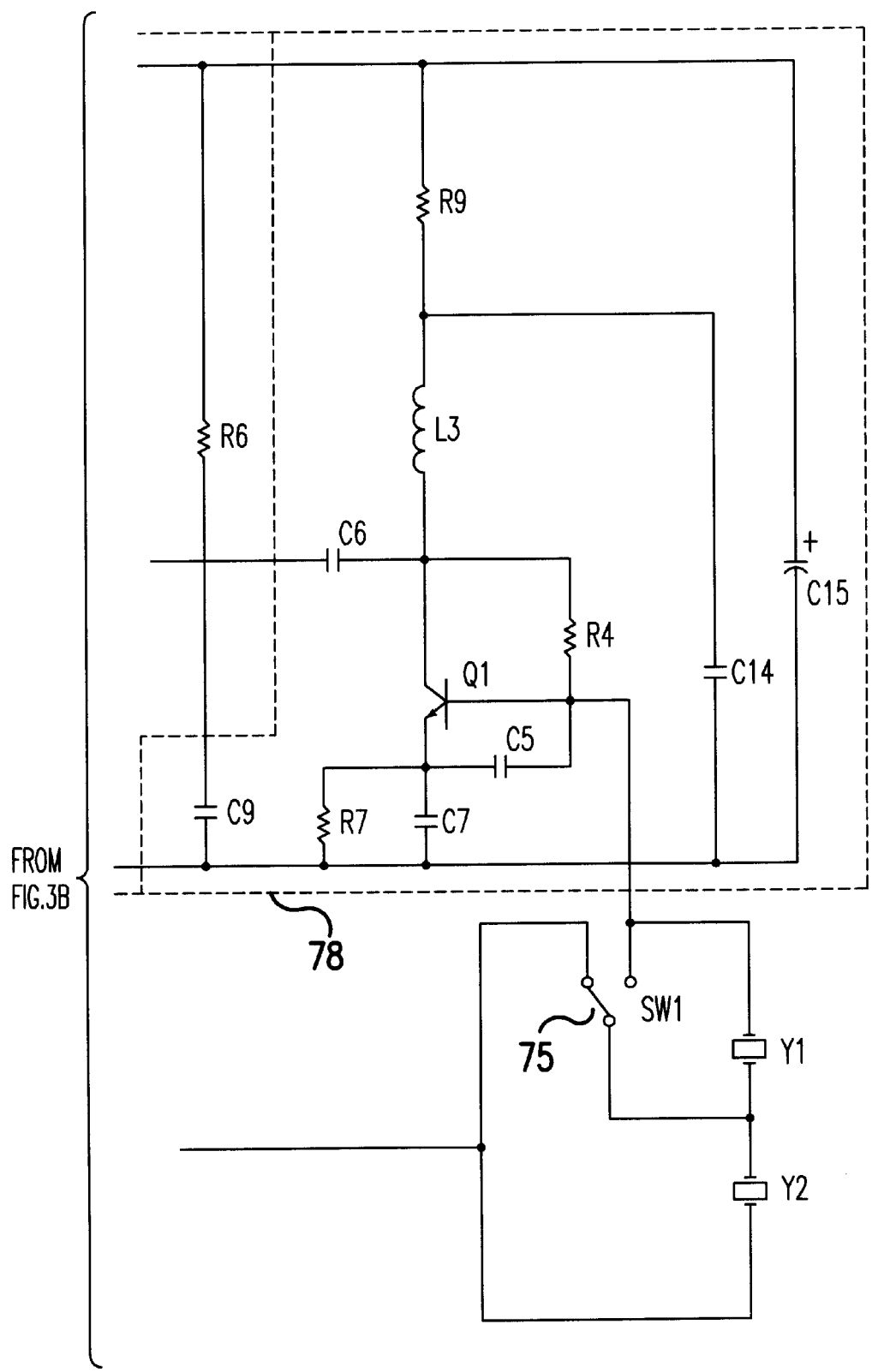

A circuit implementation of transmitter circuit 28 in accordance with one embodiment of the present invention is described in greater detail hereinafter with reference to FIG. 3. The X-axis phase generator 40 and the Y-axis phase generator 44 are coupled to separate input pins (e.g., input pins RA0, RA1, RA2, RA3) of the controller 56. The controller 56 also has pins (such as RB0–RB3) that are coupled via the buttons of the button circuit 48 and via the power saving circuit 64 to the variable frequency modulator circuit 74, and pins (such as RB4–RB6) that are coupled to the power saving circuit 64. The controller 56 also has a pin RB7 that is coupled to the variable frequency modulator circuit 74, as described below. The output of pin RB7 represents the data that is to be transmitted to the receiver 34. The clock generator 52 includes two capacitors C17 and C18 coupled to a crystal X1, which are collectively coupled to two oscillator inputs (OSC1 and OSC2) of the controller 56. FIGS. 6A1 and 6A2 illustrate the oscillograms for different signals transmitted from the controller 56 to the variable frequency modulator circuit 74, and are presented adjacent FIGS. 7A and 7B to provide a comparison with respect to the oscillograms of FIGS. 7A and 7B.

Variable frequency modulator circuit 74 has an input for receiving an analog cursor control signal from controller 56, a first output coupled to high frequency circuit 78 via the switch 75, and a second output coupled to power saving circuit 64. Variable frequency modulator circuit 74 includes the following circuit elements: a first transistor Q3 (e.g., a switching transistor), a first capacitor C3, a second capacitor C4, and an inductor L2. The first transistor Q3 includes a base electrode coupled to an output (i.e., pin RB7) of controller 56 via a resistor R3 and a diode D1, a collector electrode coupled in series with second capacitor C4 and inductor L2, and an emitter electrode coupled to first capacitor C3 and a drain electrode of a transistor Q4 (e.g., a field effect transistor). The emitter electrode of first transistor Q3 is also coupled via first capacitor C3 to the junction between second capacitor C4 and inductor L2. In summary, the transistor Q3 is controlled by the controller 56 which determines whether to the turn the transistor Q3 on or off, which will in turn determine whether capacitors C3 and C4 are in parallel or not. The different determinations will generate different "frequency deviations" with a "0" or "1" signal. In other words, the upper frequency is represented by a "0" symbol, and the lower frequency is represented by a "1" symbol. The "upper frequency" and "lower frequency" can be defined as follows:

upper frequency $f_{upper}=f_c+\text{Delta f}$ - - - symbol 0 lower frequency $f_{lower}=f_c-\text{Delta f}$ - - - symbol 1 where "Delta f" is called the "frequency deviation" representing the maximum departure of the instantaneous frequency of the FM wave from the $f_c$, where $f_c$ is the carrier frequency. As a non-limiting example, the "27.1 MHz" referred to below in connection with inductor L4 and capacitor C10 of RF amplifier 82 is $f_c$, and the 100 kHz referred to below in connection with inductor L4 and capacitor C10 of RF amplifier 82 is "Delta F" (the frequency deviation).

In operation, controller 56 selectively turns first transistor Q3 on by transmitting a "1" data signal. When first transistor Q3 is on, first capacitor C3 and second capacitor C4 are in parallel. This forms an oscillator or frequency feedback loop via inductor L2 and either a first crystal (Y1) or a second crystal (Y2), which are described below (see FIG. 6B which illustrates the working oscillograph). The parallel connection formed by the capacitors Q3 and Q4 generates greater capacitance, so that the variable frequency in the frequency feedback loop will change downwardly in its oscillation. On the other hand, when first transistor Q3 is off (i.e., when controller 56 transmits a "0" data signal), first capacitor C3 remains in the circuit, but second capacitor C4 is in effect removed from the circuit. As a result, the series capacitance with inductor L2 decreases in the frequency feedback loop, and the variable frequency in the frequency feedback loop change upwardly in its oscillation. The different effective capacitance (either C4+C3 or C3) in combination with the inductance of inductor L2 is used to determine the frequency deviation, and the upper or lower frequency is represented by symbol 0 or symbol 1, respectively, and consitutes the transmitted signal. FIG. 6B illustrates the oscillogram for the signal transmitted from the variable frequency modulator 74.

Figure 6D:
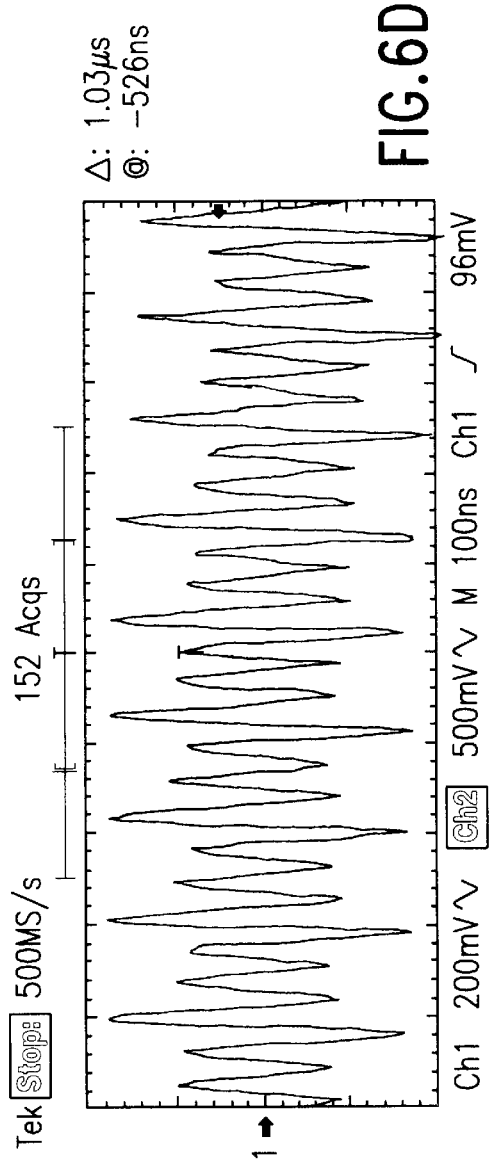
Figure 6D:
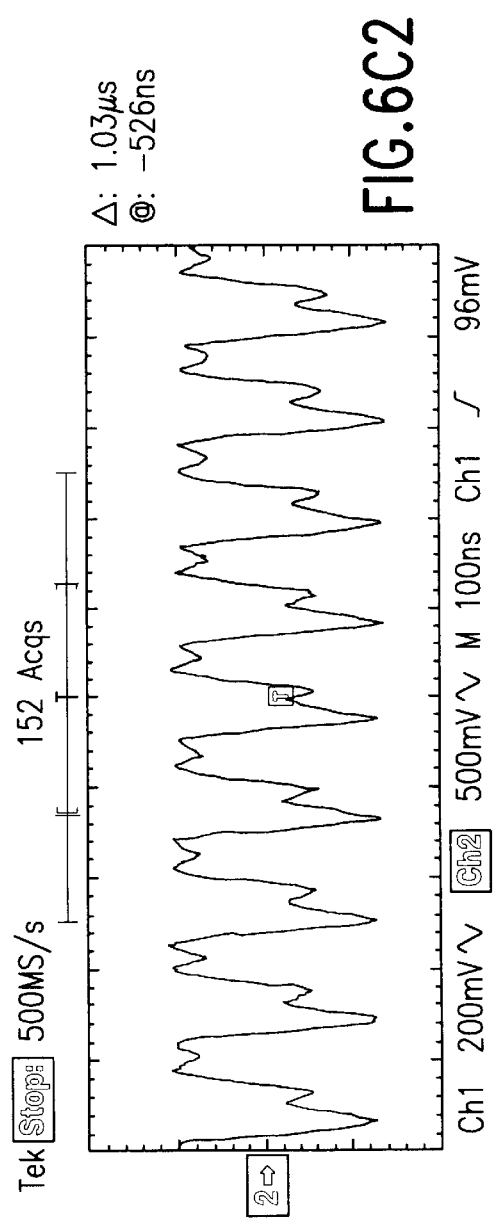
Figure 8A:
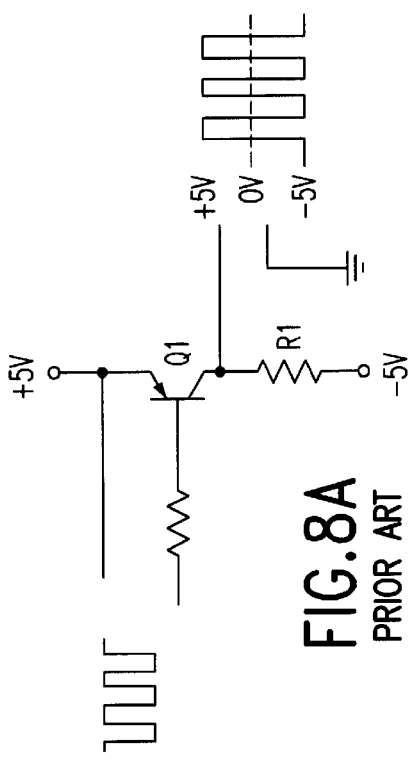
FIGS. 8A, 8B and 8C illustrate conventional output circuits utilized by conventional receivers.
Figure 8C:
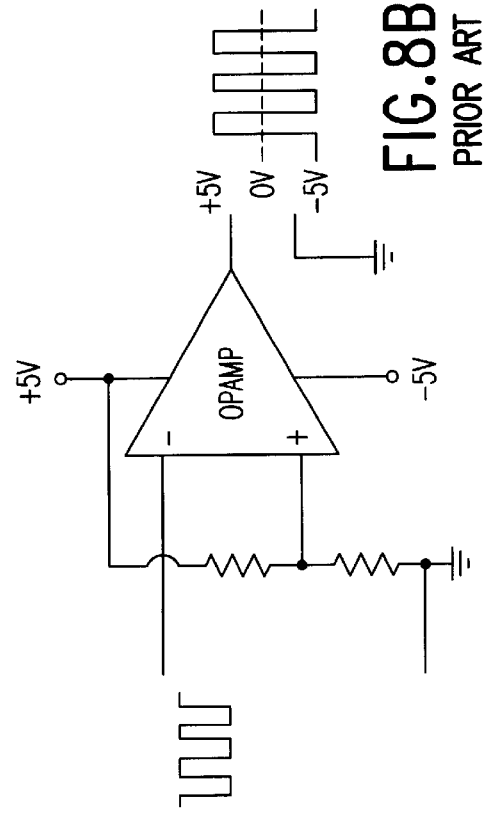
Figure 8B:
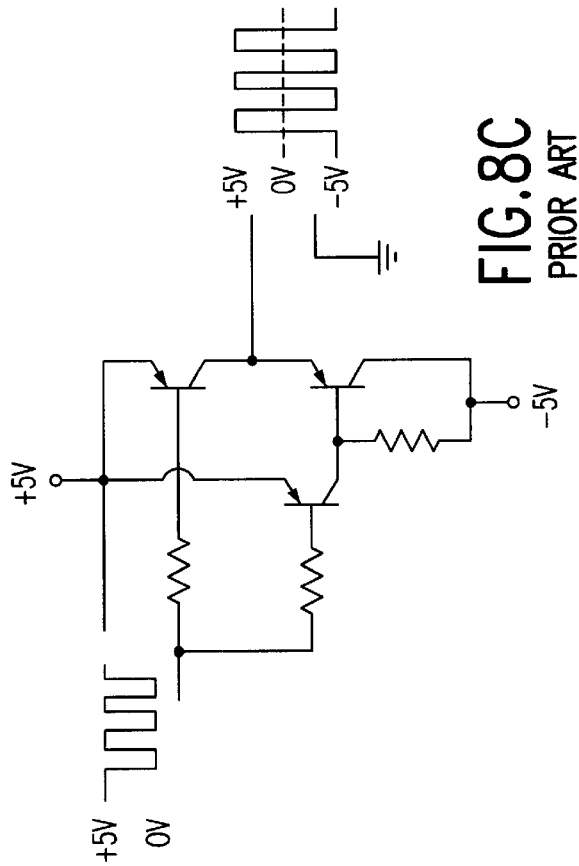

High frequency circuit 78 increases the frequency deviation of the signal by a factor (e.g., increasing the frequency of the signal by a factor of three). High frequency circuit 78 includes a transistor Q1 having a collector electrode coupled to an inductor L3 and two capacitors C6 and C9, a base electrode selectively coupled to either a first crystal (Y1) or second crystal (Y2) via switch 75, and an emitter electrode coupled to a resistor R7, and two capacitors C5 and C7. As described above, the switch 75 selectively couples the variable frequency modulator circuit 74 and the high frequency circuit 78 with either the first crystal (Y1) or the second crystal (Y2). Inductor L3 and capacitors C6 and C9 tune the received signal in a pre-defined frequency range (e.g., 27.1 MHz±100 kHz). The high frequency circuit 78 also includes a resistor R9 coupled in series with inductor L3, and two capacitors C14 and C15. Resistor R9 and capacitors C14 and C15 form an RC filter that filters out harmonic waves of the received signals, and capacitor C15 filters out ripples of the voltage regulator 65. The signals received at the base of transistor Q1 are shown in FIG. 6C2 (which represents the expanded voltage wave shown in FIG. 6C1), and the signals transmitted from the capacitor C6 of the high frequency circuit 78 to the RF amplifier 82 are shown in FIG. 6D.

The RF amplifier 82 is cross-linked to the high frequency circuit 78 for rectifying and amplifying the signals received from high frequency circuit 78. RF amplifier 82 includes a transistor Q2 having a base electrode coupled to a resistor R6, the capacitor C6 of the high frequency circuit 78, and a capacitor C9. RF amplifier 82 also includes an inductor L4 and a resistor R8 coupled in series to transistor Q2, and capacitors C10 and C11. The signals that have been processed by the high frequency circuit 78 are shaped by capacitor C9 and cross-linked via capacitor C6 to transistor Q2 for amplification. After being shaped and amplified, the signals are collected by transistor Q2 and provided to buffer circuit 86 for tuning. Inductor L4 and first capacitor C10 tune the received signals in a pre-defined frequency range (e.g., 27.1 MHz±100 kHz). Resistor R8 and capacitor C11 form an RC filter that filters out harmonic waves of the received signals. The output of RF amplifier 82 is the node between resistor R8 and capacitor C11. FIG. 6E illustrates the signals that are transmitted from the RF amplifier 82 to the buffer circuit 86.

Buffer circuit 86 tunes the output (i.e., passing only received signals in a desired bandwidth) and transmits these signals. Buffer circuit 86 includes an inductor L5 and a capacitor C12 that tune the received signal in a pre-defined frequency range (e.g., 27.1 MHz±100 kHz) to effectively filter out harmonic waves. The tuned signal (which is shown in FIG. 6F) is then transmitted to the receiver circuit 34 via the antenna 90.

A voltage regulator 65 provides a stable voltage as an operating power source to the two sets of photodiodes LED1 and LED2 in the X and Y phase generators 40 and 44, respectively. LED1 and LED2 are coupled to pins RB4–RB6 of the controller 56.

The power saving circuit 64 is coupled to the pin RB3 of the controller 56, and includes a resistor R5 coupled to the button switch 48, a capacitor C8 and a transistor Q4 that is coupled to the emitter electrode of the transistor Q3 of variable frequency modulator circuit 74. Resistor R5 and capacitor C8 form an integration circuit that triggers transistor Q4. The integration circuit receives high voltage (e.g., 3V) to make transistor Q4 turn on when the pointing device 24 is active, and receives low voltage (e.g., 0V) to make transistor Q4 turn off when the pointing device 24 is inactive.

After a specific period of time (e.g., 30 seconds) in which the pointing device 24 is inactive, the controller 56 enters into a dormant or inactive state, causing its pins RB4–RB6 to stop supplying low voltage to the diodes LED1 and LED2. The gate electrode of the field effect transistor Q4 is then in low potential, and therefore turns off, so as to cut the power supply to high frequency circuit 78, RF amplifier 82 and buffer circuit 86. In other words, the drain electrode of transistor Q4 is open (i.e., high voltage level), so that high frequency circuit 78, RF amplifier 82 and buffer circuit 86 are not "grounded". The result is that high frequency circuit 78, RF amplifier 82 and buffer circuit 86 cannot form a loop circuit, thereby reducing the power that is needed. In other words, the drain electrode of transistor Q4 is regarded as "ground" if transistor Q4 was on.

When any button of the button circuit 48 is pressed to connect its associated switch, a pulse variation will cause the controller 56 (via pin RB3) to terminate its inactive state. The pins RB4–RB6 will resume the provision of voltage to the light emitting diodes LED1 and LED2, and the field effect transistor Q4 will turn on so as to make the drain electrode of transistor Q4 as "ground". This causes high frequency circuit 78, RF amplifier 82 and buffer circuit 86 form a loop circuit, thereby allowing normal operation of the pointing device 24 to resume. At the same time, pulse variations received from X-axis and Y-axis phase generators 40, 44 will cause the controller 56 (via pin RB3) to compute and create a series of digital signals, which are provided via pin RB7, resistor R3 and diode D1 to the base of the switching transistor Q3 in the variable frequency modulator 74 to control the on-off of the transistor Q3 and to determine the upper frequency and lower frequency, as described above.

3. Receiver 34

Figure 4:
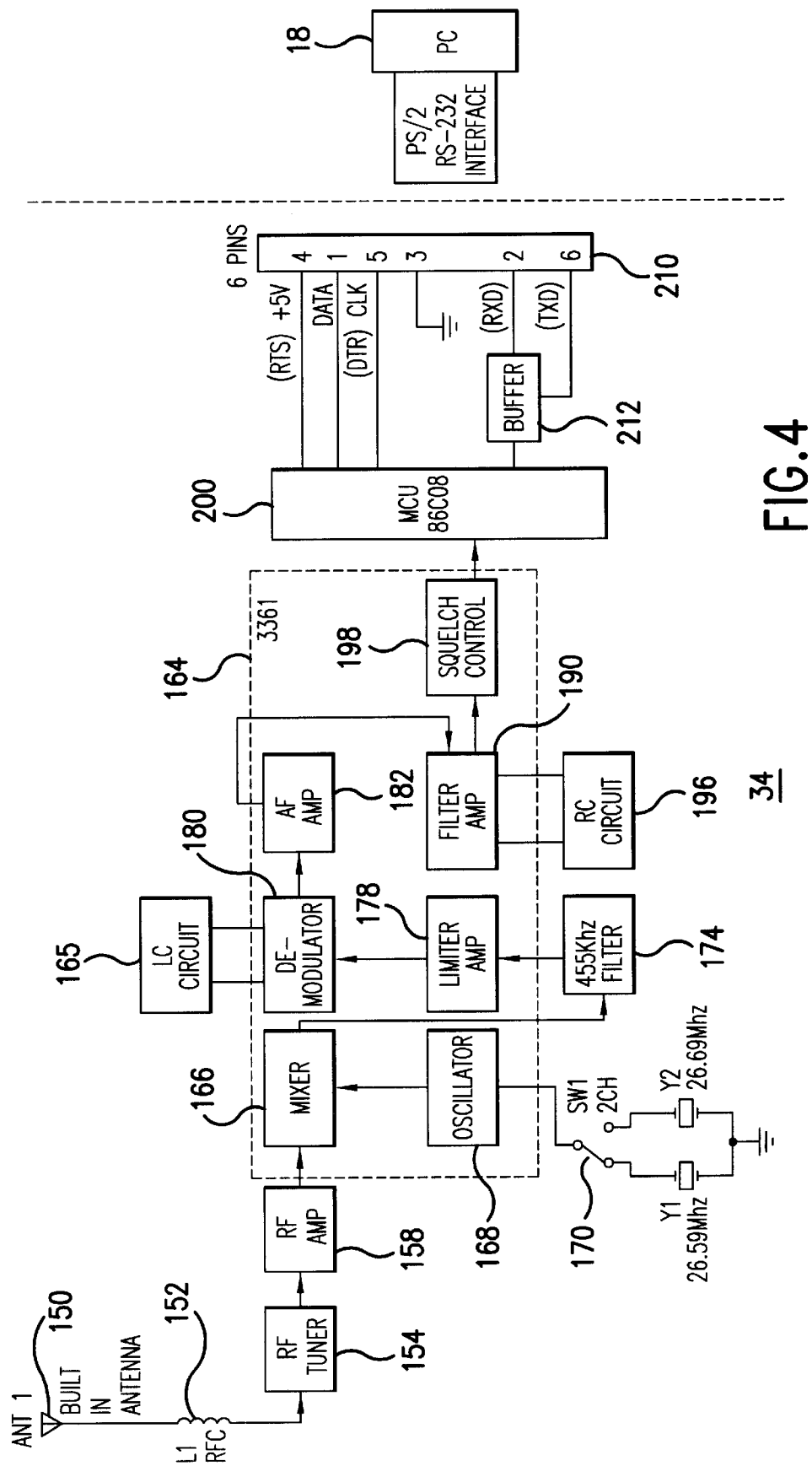
FIG. 4 illustrates a block diagram illustrating the receiver of FIG. 1 configured in accordance with one embodiment of the wireless cursor pointing system of the present invention.

FIG. 4 is a block diagram illustrating the receiver circuit 34 of FIG. 1 configured in accordance with one embodiment of the wireless cursor pointing system 14 of the present invention. Receiver 34 includes an antenna 150 for receiving the high frequency modulated signals from the transmitter circuit 28. An inductor 152 is provided for filtering the received signals. Receiver circuit 34 includes an RF tuner 154 for tuning the receiver circuit 34 so that only signals in a predetermined frequency bandwidth (e.g., 27.1 MHz±100 kHz) are received. An RF amplifier 158 is coupled to the output of the RF tuner 154 for amplifying the received signals.

Figure 7B:
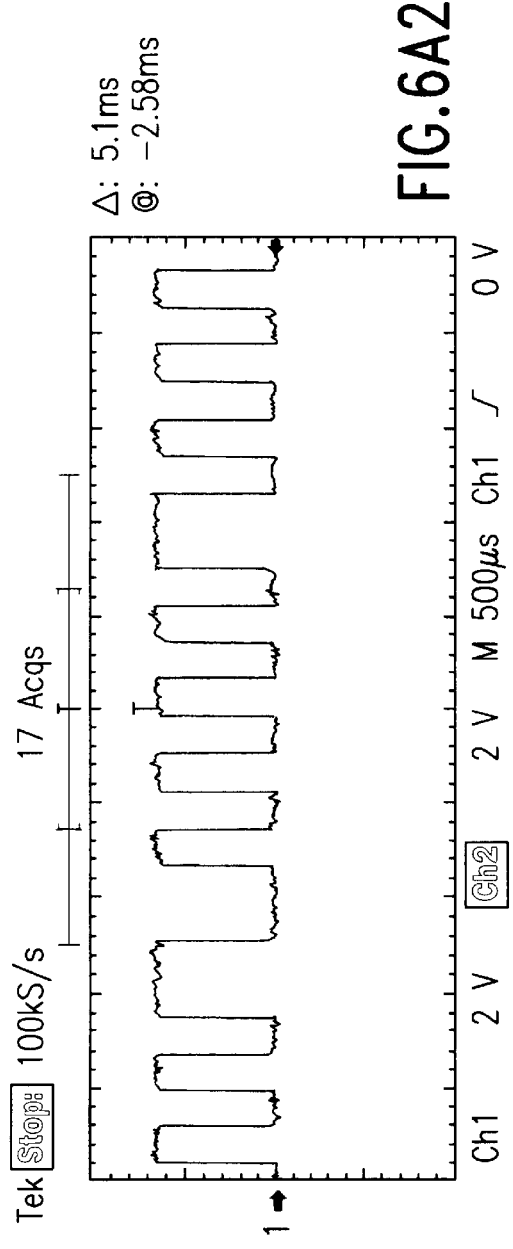
Figure 7B:
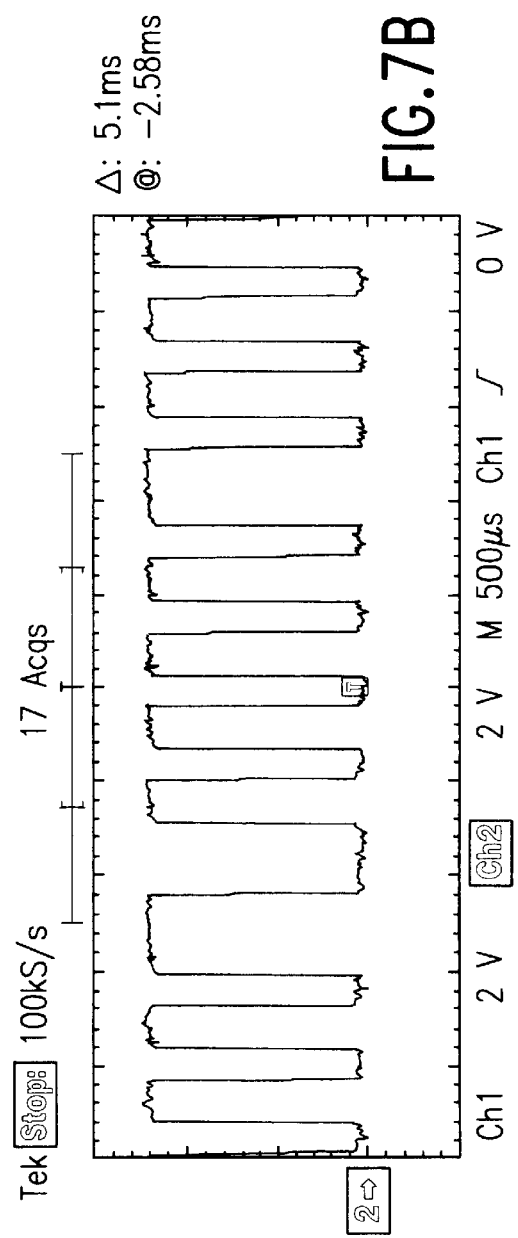

Receiver circuit 34 also includes a demodulation circuit 164 that is coupled to the output of the RF amplifier 158. In the preferred embodiment, de-modulation circuit 164 is implemented with a demodulation circuit Part No. MC3361C (also known as "Low Power Narrowband FM IF") available from Motorola, which is designed for use in FM dual conversion communications equipment. De-modulation circuit 164 receives the RF signal and responsive thereto generates a demodulated signal that is provided to an MCU 200. An exemplary waveform representing the demodulated signal is illustrated in FIG. 7B. Demodulation circuit 164 performs the following: (1) sets a reference signal at a predetermined reference frequency (e.g., 26.59 to 26.69 MHz); (2) mixes a received RF signal, having an RF frequency, with the reference signal to generate a frequency difference; and (3) eliminates an incorrect received RF signal (i.e., a received RF signal that when mixed with the reference signal generates a difference that is not within an acceptable difference range, e.g., 450 Khz±10 KHz).

Demodulation circuit 164 includes a mixer 166 that receives the RF signal from RF amplifier 158 and a local clock (i.e., reference) signal from an oscillator 168. Based on the RF signal and the local clock signal, mixer 166 calculates the frequency difference between these two signals, and either passes the RF signal through or blocks the RF signal based on whether the frequency difference is within a pre-determined range, as discussed previously.

A switch 170 is provided for selectively coupling oscillator 168 to either a first crystal (Y1) or a second crystal (Y2). If the frequency difference is not in the pre-determined range, then switch 170 is in an incorrect position, and the user can manipulate switch 170 to its alternative position. Otherwise, the position of switch 170 is correct.

A 455 KHz ceramic filter 174 is coupled to receive the output of mixer 166. Ceramic filter 174 filters the output of the mixer 166 and then provides the filtered signal to a limited amplifier 178. Limited amplifier 178 amplifies the signal to a predetermined voltage level in preparation for demodulation.

A demodulator 180 is coupled to limited amplifier 178 to demodulate the signal received therefrom. After demodulation, the signal is provided to an acoustic frequency (AF) amplifier 182 for further amplification. FIG. 7A illustrates an exemplary waveform of the output signal provided by AF amplifier 182, which is then provided to a filter amplifier 190 to filter out "rough edges" (i.e., unwanted portions of the signal). Filter amplifier 190 works in conjunction with an RC circuit 196 to filter out undesired portions of the signal. The signal is then passed to a squelch control 198 that stabilizes the signal so that the "1" and "0" signals can be distinguished more readily. FIG. 7B illustrates an exemplary waveform of the output signal provided by squelch control 198.

Receiver circuit 34 also includes a micro-controller unit (MCU) 200 for receiving the demodulated output signal from demodulation circuit 164 and for communicating the output signal with the PC 18. MCU 200 provides PS/2 and RS-232 signals to either (1) a PS/2 port, or (2) a RS-232 port. PS/2 port and RS-232 port are coupled to a connector 210 that has one or more conductors. Connector 210 can be coupled to a PC 18 via an interface, a cable and/or other conductors.

The PS/2 port communicates between MCU 200 and PC 18 using "+5V" (pin 4), "DATA" (pin 1), "CLK" (pin 5) and "ground" (pin 3). On the other hand, the RS-232 port communicates between MCU 200 and PC 18 using "RTS" (pin 4), "RXD" (pin 2), "DTR" (pin 5), "TXD" (pin 6) and "ground" (pin 3). The voltage level of RS-232 port is larger than +3V (e.g., +5V) or less than −3V (e.g., −5V), and the voltage level of MCU 200 is either +5V or 0V. Thus, a buffer circuit 212 can be interposed between RS-232 port and connector 210. Since a conventional PC 18 can only receive +5V and −5V, and not in the form of 5V or 0V (as output by MCU 200), the buffer circuit 212 converts the 5V and 0V into +5V and −5V signals that can be used by the PC 18.

Figure 5A:
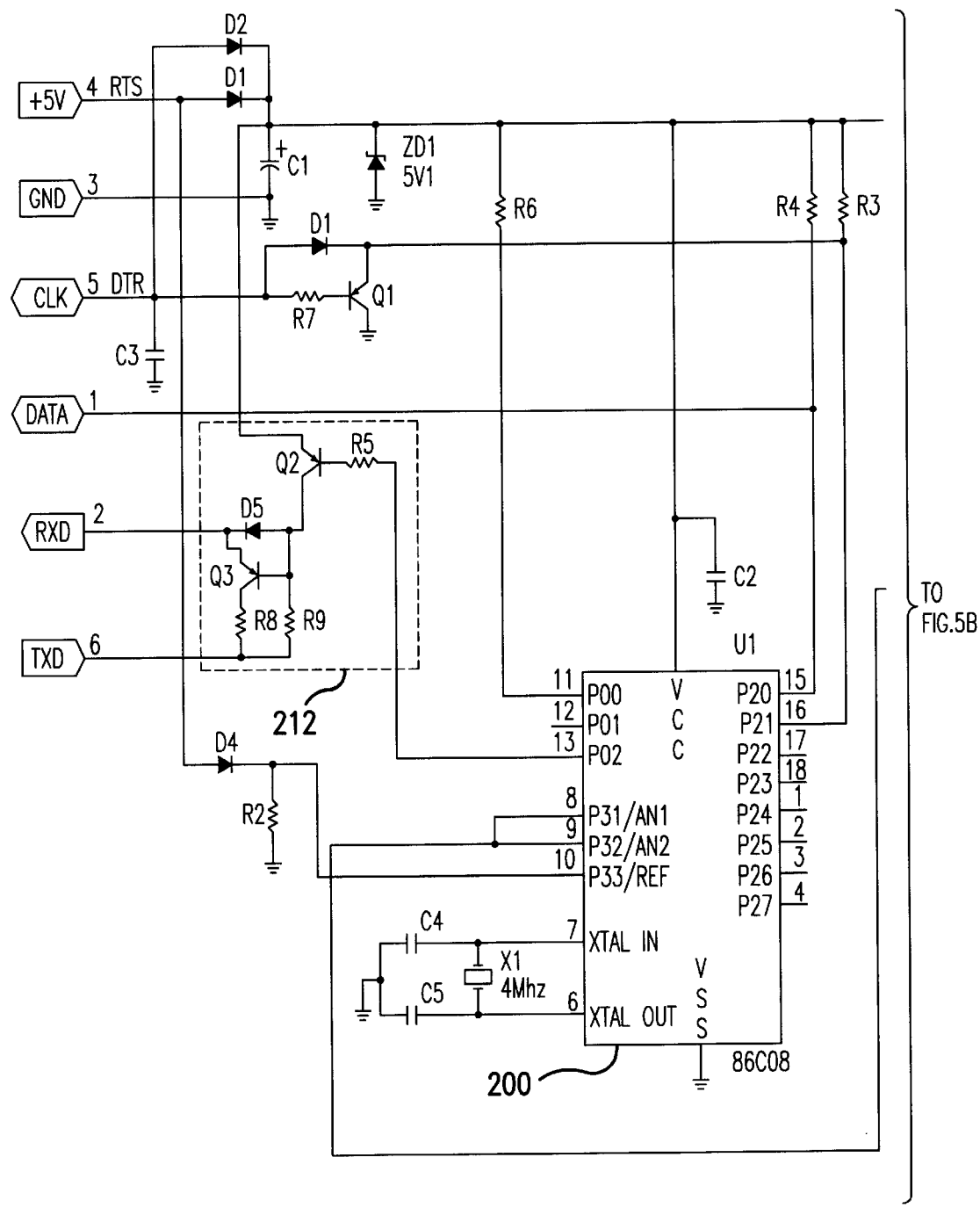
FIG. 5 is a circuit diagram illustrating in greater detail the receiver of FIG. 4.
Figure 5B:
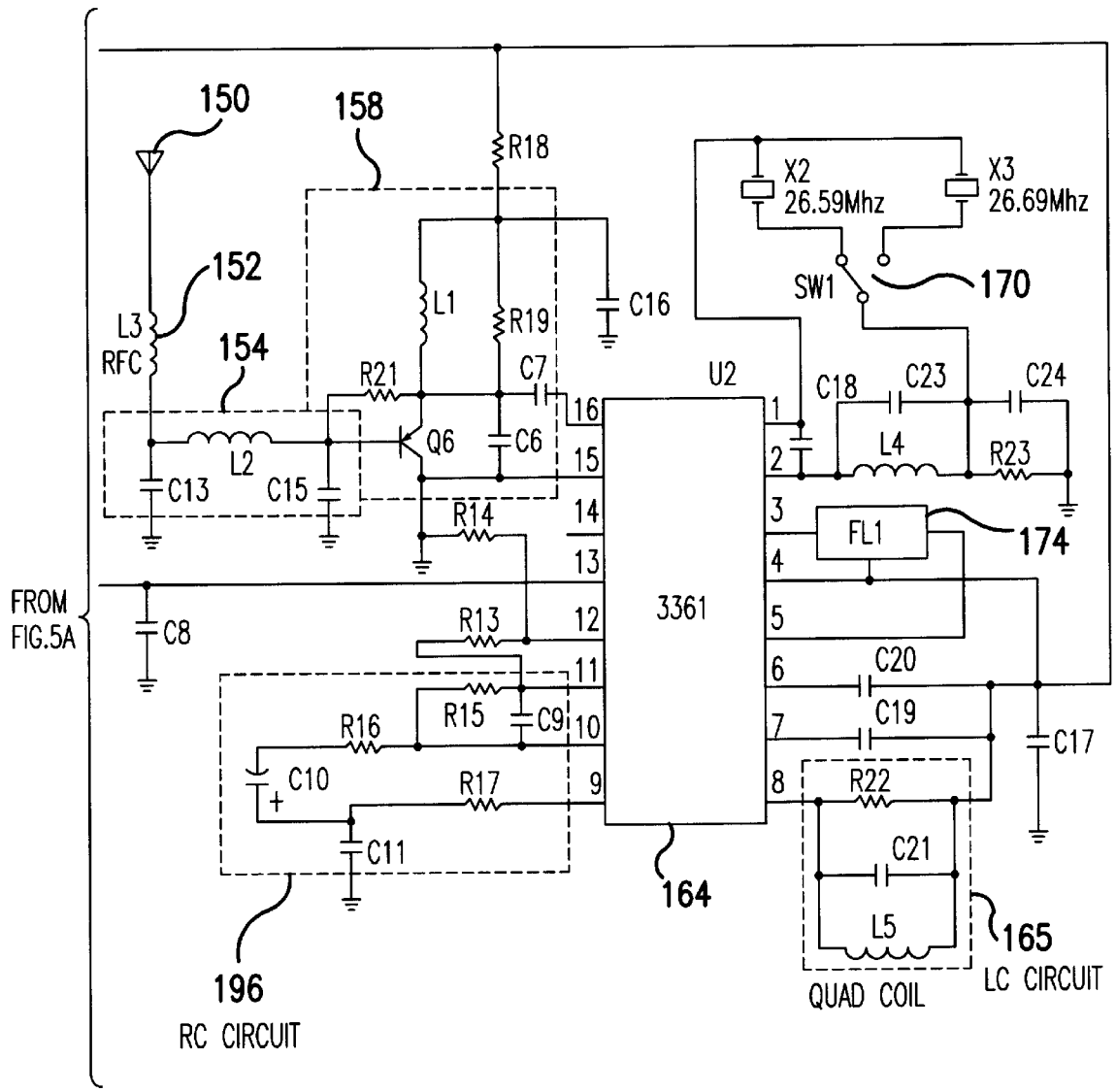

FIG. 5 is a circuit diagram illustrating in greater detail the receiver circuit 34 of FIG. 4 according to one embodiment. Preferably, receiver circuit 34 is a superheterodyne receiver. RF tuner 154 includes an inductor L2 and two capacitors C13 and C15, which tune RF tuner 154 to a pre-defined frequency range (e.g., 27.1 MHz±100 KHz). Thus, the RF tuner 154 improves the sensitivity of the receiver circuit 34.

RF amplifier 158 includes a transistor Q6 for high power amplification of the signal received from RF tuner 154. Transistor Q6 includes a base electrode for receiving an input signal from RF tuner 154, a collector electrode coupled to an inductor L1, a resistor R19, a first electrode of capacitor C6, and an emitter electrode coupled to a second electrode of capacitor C6. The transistor Q6 is used for high frequency amplification of the received signals, and its input frequency range is restricted by a wide bandwidth circuit (i.e., operating as a bandpass filter) which is formed by inductor L1, resistor R19, and capacitor C6 as a feedback loop. Thus, the RF amplifier 158 improves the selectivity of the receiver circuit 34. The amplified signals are illustrated in FIG. 7A, and are provided to the demodulation circuit 164 for demodulation.

When demodulation circuit 164 is implemented with the Part No. MC3361C integrated circuit, pin 16 receives the high frequency signals from RF amplifier 158. Pin 15 is coupled to ground. Pin 1 and 2 are coupled to switch 170 that selectively couples pins 1 and 2 to either the first crystal (Y1) operating at a first oscillation frequency (e.g., 26.57 MHz) or the second crystal (Y2) operating at a second oscillation frequency (e.g., 26.67 MHz). The mixer 166 then mixes the high frequency signals with one of the local oscillation frequency signals. When the received signal is within the desired range, pin 3 generates a frequency difference of 455 KHz±10 KHz.

A porcelain filter (FL1), which is actually the filter 174 in FIG. 4, is coupled to pin 3 and pin 5 for filtering out and blocking unwanted signals. Filtered signals are provided to pin 5 and returned to the demodulation circuit 164 for clipping and amplification before demodulation. An LC circuit 165 (see also FIG. 4) is coupled to pin 8 for providing 455 KHz de-modulated signals. After quadrature de-modulation and amplification, these acoustic frequency (AF) signals are provided at pin 9 to the RC circuit 196. After high frequency filtering and low-pass amplification between pins 9 and 12, the signal is provided back to the demodulation circuit 164 for waveform restoration before being provided at pin 13 to MCU 200. FIG. 7B illustrates the signals that are provided to the MCU 200.

The MCU 200 can be provided in the form of a #86C08 micro-controller unit made by Zilog, Inc. MCU 200 links the PC 18 through either the PS/2 port or the RS-232 port. The output pin PO2 of MCU 200 is coupled to buffer circuit 212, which includes two sets of transistors Q2, Q3, resistors R8, R9, R5, and a diode D5. Buffer circuit 212 achieves high input resistance and low output resistance that in turn saves power by reducing current levels employed in receiver circuit 34.

As described above, the receiver 34 can be used via both a RS-232 and PS/2 link. When the RS-232 port driver 208 is to be used for signal transmission, the positive power in the receiver circuit 34 is provided by the "Request to Send" (RTS) and "Data Terminal Ready" (DTR) signals on an adapter plug (not shown), while negative voltage is provided by TXD (Transmitted Data). When the signal is transmitted from pin PO2 of MCU 200, the signal passes through resistor R5 to control the switching of transistor Q2, If the signal is at a high voltage level (i.e., "1"), then transistor Q2 does not turn on, and the negative voltage TXD is provided via resistor R9 to the base of transistor Q3 to cause the transistor Q3 to generate a forward bias and to turn on, so that RXD (Received Data) receives a negative voltage. On the other hand, if the signal from pin PO2 is at a low voltage level (i.e., "0"), then transistor Q2 will turn on, causing positive voltage to be transmitted from the transistor Q2 via diode D5 to RXD. At this time, transistor Q3 is cut off because its base becomes positive from the positive voltage received from transistor Q2. The process is repeated to generate positive (±5V) and negative (−5V) voltage potentials on RXD, which represent the actual data signals. Thus, the RXD output in the receiver 34 adopts two transistors Q2 and Q3 for the exchange output. The two transistors Q2 and Q3 turn on in turn, thereby minimizing current consumption. This design provides not only higher input resistance while reducing output resistance but also minimizes load consumption, thereby effectively reducing load consumption during signal transmission.

Further, as explained above, the voltage level standards adopted by the MCU 200 are between positive (e.g., 5V) and zero potential. Therefore, when the PC 18 provides information from RTS to pin P33 of MCU 200, because the information is either in the form of a positive or negative voltage level, diode D4 and resistor R2 are used to block the negative voltage.

On the other hand, when the signals from DTR (DTR is coupled to PC 18) are at a negative voltage level, transistor Q1 in FIG. 5 will turn on to prevent the negative voltage from being transmitted to MCU 200. As explained above, it is desirable to prevent negative voltage from going to MCU 200 because the voltage level of each pin at MCU 200 is either at +5V or 0V.

When the receiver 34 uses a PS/2 link, then RXD and TXD will be rendered inoperative through the transformation of an adapter plug. When RTS is fixed at +5V, DTR becomes the clock CLK, so that during transmission, diode D1, resistor R7 and transistor Q1 are used for bi-directional data transmission. For example, when PC 18 transmits data to MCU 200 via pin 1 of connector 210 (see FIG. 4), the "CLK" (pin 5 of connector 210) will be set to 0V by MCU 200, and when MCU 200 transmits data to PC 18 via pin 1 of connector 210, MCU 200 will output a series of clock pulses to PC 18 via "CLK" (pin 5 of connector 210). In addition, DATA (in FIG. 5) directly drives MCU 200 via pin P20, and the high and low levels of "DATA" (see pin 1 of connector 210) and "CLK" (pin 5 of connector 210) are at +5V and 0V, respectively.

Thus, as described above, the present invention provides a wireless pointing device 24 having a transmitter 28 that uses a switching transistor Q3 that is coupled with a fixed capacitor C4 and an inductor L2 (see FIG. 3), which together are connected in series with a quartz oscillator Y1 or Y2 (that is the source of improved oscillation). This is combined with a high frequency circuit 78 that causes the frequency deviation of the transmission frequency generated by the oscillator Y1 or Y2 to be increased. After high frequency filtering and tuning, the information is transmitted to a receiver 34. The design of the transmitter 28 is characterized by its simplified circuit structure, increased frequency change, and improved transmission efficiency.

RF tuner 154 and RF amplifier 158 have the functions of tuning, with RF tuner 154 tuning the received signals with a wider bandwidth of 27.1 MHz±200 kHz (or 27.1 MHz±300 kHz), and with RF amplifier 158 tuning the received signals with a restrictive bandwidth of 27.1 MHz±100 kHz. The receiver 34 does not need to be adjusted because the R, L, C elements of RF tuner 154 and RF amplifier 158 are fixed. As a result, the receiver 34 is simple in design and inexpensive to implement. In addition, the buffer circuit 212 uses a double transistor exchange output, with a simple circuit design having minimal circuit components, and having high input resistance and low output resistance that effectively lower load consumption.

Although certain components, subsystems, and blocks have been described above as including certain elements, it will be appreciated by those skilled in the art that such disclosures are non-limiting, and that different elements, or combinations thereof, can be provided for such components, subsystems, and blocks without departing from the spirit and scope of the present invention. It will also be recognized that the above described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A cursor control device comprising:
   an encoder for generating position information regarding the cursor pointing device;
   a button circuit for receiving user activated button signals;
   a controller coupled to the encoder and the button circuit for receiving the position information and button signals, respectively, and responsive thereto for generating a control signal; and a high frequency modulator coupled to the controller for receiving the control signal and generating an output signal to be transmitted to a receiver, said high frequency modulator including:
  a variable frequency modulator circuit having a switching transistor that is selectively turned on or off to select between one of only two predetermined frequency deviations of the control signal; and
  a high frequency circuit for increasing the frequency deviation of the control signal;
wherein the variable frequency modulator circuit further includes a first capacitor and a second capacitor that are in parallel when the switching transistor is turned on.

2. The device of claim 1, further including an RF amplifier coupled to the high frequency circuit for rectifying and amplifying the control signal from the high frequency circuit.

3. The device of claim 2, further including a buffer circuit coupled to the RF amplifier for filtering out signals received from the RF amplifier from within a predetermined frequency bandwidth.

4. The device of claim 3, further including an antenna coupled to the buffer circuit for transmitting signals provided by the buffer circuit.

5. The device of claim 1 wherein the cursor control device is a mouse.

6. The device of claim 1 wherein the cursor control device is a track-ball.

7. The device of claim 1 wherein the cursor control device is a touch-pad.

8. The device of claim 1, further including a power saving circuit coupled to the controller, button circuit and high frequency modulator, and operable in a normal operation mode and a power saving mode, with the high frequency modulator switched off during the power saving mode.

9. The device of claim 1, wherein the variable frequency modulator circuit includes a frequency feedback loop that includes the switching transistor.

10. A wireless cursor control system comprising:
(a) a pointing device having a controller for receiving user input and for providing a control signal, and a transmitter that includes an antenna and a high frequency modulator coupled to the controller for receiving the control signal and generating an output signal for transmission via the antenna, said high frequency modulator including:
  a variable frequency modulator circuit having a switching transistor that is selectively turned on or off to select between one of only two predetermined frequency deviations of the control signal; and
  a high frequency circuit for increasing the frequency deviation of the control signal to produce the output signal; and
(b) a receiver having an antenna that receives the output signal, and a demodulation circuit for demodulating the received output signal;
wherein the variable frequency modulator circuit further includes a first capacitor and a second capacitor that are in parallel when the switching transistor is turned on.

11. The system of claim 10, wherein the receiver further includes a tuner coupled to the antenna for tuning the received signals within a predetermined frequency bandwidth, and an amplifier coupled between the tuner and the demodulation circuit for amplifying the tuned signals prior to demodulation.

12. The system of claim 11, wherein the receiver further includes a controller for receiving the demodulated output signal from demodulation circuit and for communicating the demodulated output signals with a PC.

13. The system of claim 12, further including a buffer circuit coupled between the controller of the receiver and the PC for converting the demodulated output signals to signals that are readable by the PC.

14. The system of claim 10, wherein the high frequency modulator further includes an RF amplifier coupled to the high frequency circuit for rectifying and amplifying the control signal from the high frequency circuit.

15. The system of claim 14, wherein the high frequency modulator further includes a buffer circuit coupled to the RF amplifier for filtering out signals received from the RF amplifier from within a predetermined frequency bandwidth.

16. The system of claim 15, wherein the transmitter further includes an antenna coupled to the buffer circuit for transmitting signals provided by the buffer circuit.

17. The system of claim 10, wherein the pointing device further includes a power saving circuit coupled to the controller and high frequency modulator, and operable in a normal operation mode and a power saving mode, with the high frequency modulator switched off during the power saving mode.

18. The system of claim 10, wherein the variable frequency modulator circuit includes a frequency feedback loop that includes the switching transistor.

19. A cursor control device comprising:
an encoder for generating position information regarding the cursor pointing device;
a button circuit for receiving user activated button signals;
a controller coupled to the encoder and the button circuit for receiving the position information and button signals, respectively, and responsive thereto for generating a control signal; and
a high frequency modulator coupled to the controller for receiving the control signal and generating an output signal to be transmitted to a receiver, said high frequency modulator including:
  a variable frequency modulator circuit having a switching transistor that is selectively turned on or off to select between one of only two predetermined frequency deviations of the control signal; and
  a high frequency circuit for increasing the frequency deviation of the control signal;
wherein the variable frequency modulator circuit further includes a first capacitor, a second capacitor, and an inductor, with the switching transistor coupled via the first capacitor to a junction between the second capacitor and the inductor.

20. The device of claim 1, wherein the switching transistor is coupled to the controller which determines whether to turn the switching transistor on or off.

21. A wireless cursor control system comprising:
(a) a pointing device having a controller for receiving user input and for providing a control signal, and a transmitter that includes an antenna and a high frequency modulator coupled to the controller for receiving the control signal and generating an output signal for transmission via the antenna, said high frequency modulator including:
  a variable frequency modulator circuit having a switching transistor that is selectively turned on or off to select between one of only two predetermined frequency deviations of the control signal; and
  a high frequency circuit for increasing the frequency deviation of the control signal to produce the output signal; and
(b) a receiver having an antenna that receives the output signal, and a demodulation circuit for demodulating the received output signal;

wherein the variable frequency modulator circuit further includes a first capacitor, a second capacitor, and an inductor, with the switching transistor coupled via the first capacitor to a junction between the second capacitor and the inductor.

22. The system of claim 10, wherein the switching transistor is coupled to the controller which determines whether to turn the switching transistor on or off.

* * * * *